(12) United States Patent
Kim et al.

(10) Patent No.: US 10,377,297 B2
(45) Date of Patent: Aug. 13, 2019

(54) LAMP SWITCH FOR PARKING BRAKE

(71) Applicant: DONGWOUN INDUSTRIAL CO., LTD., Ansan-si, Gyeonggi-do (KR)

(72) Inventors: Ho Jin Kim, Ansan-si (KR); Tae Won Yoon, Suwon-si (KR); Su Hyeon Han, Ansan-si (KR)

(73) Assignee: DONGWOUN INDUSTRIAL CO., LTD., Ansan-si (KR)

( * ) Notice: Subject to any disclaimer, the term of this patent is extended or adjusted under 35 U.S.C. 154(b) by 24 days.

(21) Appl. No.: 15/830,053

(22) Filed: Dec. 4, 2017

(65) Prior Publication Data

US 2018/0162262 A1   Jun. 14, 2018

(30) Foreign Application Priority Data

Dec. 9, 2016 (KR) .................. 10-2016-0167881
Dec. 19, 2016 (KR) .................. 10-2016-0173565

(51) Int. Cl.
| | | |
|---|---|---|
| *H01H 21/24* | (2006.01) | |
| *B60Q 1/00* | (2006.01) | |
| *B60Q 3/82* | (2017.01) | |
| *B60T 7/10* | (2006.01) | |
| *B60Q 3/16* | (2017.01) | |
| *B60Q 1/44* | (2006.01) | |
| *H01H 3/16* | (2006.01) | |

(52) U.S. Cl.
CPC .......... *B60Q 1/0076* (2013.01); *B60Q 1/441* (2013.01); *B60Q 3/16* (2017.02); *B60Q 3/82* (2017.02); *B60T 7/10* (2013.01); *B60T 7/102* (2013.01); *H01H 21/24* (2013.01); *H01H 3/16* (2013.01); *H01H 2235/01* (2013.01)

(58) Field of Classification Search
CPC ...... H01H 21/24; H01H 21/28; H01H 21/285; H01H 2225/012; H01H 13/803; H01H 13/18; H01H 13/186; H01H 13/52; H01H 13/62; H01H 131/20; H01H 1/20; H01H 1/2008; H01H 2003/146; B60Q 1/425; B60Q 1/441; B60Q 1/387; B60Q 1/343; B60Q 1/36

See application file for complete search history.

(56) References Cited

U.S. PATENT DOCUMENTS

| | | | | |
|---|---|---|---|---|
| 2009/0237189 A1* | 9/2009 | Nishiguchi | ............ | B60Q 1/441 335/152 |
| 2012/0056617 A1* | 3/2012 | Hirose | .................. | B60Q 1/441 324/207.25 |
| 2015/0027861 A1* | 1/2015 | Hoskins | .................. | F16H 59/08 200/43.11 |

FOREIGN PATENT DOCUMENTS

| | | |
|---|---|---|
| JP | 2000-062528 A | 2/2000 |
| JP | 4280146 B2 | 6/2009 |
| KR | 10-1405323 B1 | 6/2014 |

* cited by examiner

*Primary Examiner* — Ahmed M Saeed
(74) *Attorney, Agent, or Firm* — Sughrue Mion, PLLC

(57) ABSTRACT

Disclosed is a lamp switch for a parking brake and a structure of a lamp switch is configured to be changed, which indicates that a parking brake is pulled as lighting a lamp on a instrument panel of a vehicle by pulling a lever for the parking brake to prevent malfunction due to poor contact of the lamp switch when an external shock occurs, enhance fuel efficiency and reduce manufacturing cost due to weight reduction, and reduce the number of assembled fixtures.

4 Claims, 5 Drawing Sheets

LAMP SWITCH FOR PARKING BRAKE

CROSS-REFERENCE TO RELATED APPLICATIONS

This application claims priority to and the benefit of Korean Patent Application Nos. 10-2016-0167881 and 10-2016-0173565 filed in the Korean Intellectual Property Office on Dec. 9 & 19, 2016, respectively, the entire contents of which are incorporated herein by reference.

TECHNICAL FIELD

The present invention relates to a lamp switch for a parking brake, and more particularly, to a lamp switch for a parking brake which a structure of a lamp switch is configured to be changed, which indicates that a parking brake is pulled as lighting a lamp on a instrument panel of a vehicle by pulling a lever for the parking brake to prevent malfunction due to poor contact of the lamp switch when an external shock occurs, enhance fuel efficiency and reduce manufacturing cost due to weight reduction, and reduce the number of assembled fixtures.

BACKGROUND ART

In general, a driver uses a parking brake lever or a parking brake pedal to prevent a vehicle from moving on a slope when parking the vehicle.

When the parking brake lever or the parking brake pedal operate as described above, it is necessary to determine whether a parking brake is applied or whether the parking brake is not applied by detecting sensing the operation in the vehicle.

For example, when the vehicle travels after the vehicle is changed from a P-stage (parking state) to a D-stage (driving state) while the parking brake is applied, since the vehicle is in an abnormal traveling state, the vehicle needs to detect the abnormal traveling state to guide the abnormal traveling state to a driver.

To this end, a switch for the parking brake which interlocks with the operation of the parking brake lever or the parking brake pedal is applied into the vehicle.

A general switch for the parking brake in the related art is a structure constituted by a shaft, a bracket, a spring, a first terminal, and a second terminal and the shaft when the parking brake lever or the parking brake pedal operates interlocks with the parking brake lever or the parking brake pedal.

In this case, since the shaft moves in direct contact with the bracket made of metal, noise due to perturbation between the shaft and the bracket occurs. When the shaft is made of a metallic material, the noise caused due to the perturbation between the shaft and the bracket is generated louder.

Further, in the parking brake switch in the related art, there is a possibility that defects will be caused due to misassembly as the shaft, the spring, the first terminal, and the second terminal are assembled with the bracket as a reference configuration.

In order to solve the problems, a parking brake switch has been filed in Korean Patent Application No. 10-2012-0139661.

The parking brake switch in the related art includes a shaft interlocked with the operation of the parking brake lever or parking brake pedal, a spring that provides elastic restoring force to the shaft while interlocking with the operation of the shaft, a bracket having a first terminal for flow of electricity, the first terminal having a second terminal for the flow of the electricity, the second terminal for connecting or disconnecting the first terminal and the second terminal according to the position of the shaft after being coupled with a lower end of the shaft, and a base for supporting at least one of the shaft, the spring, the bracket, the first terminal, and the second terminal and the base is configured to include a guide shape for supporting positional movement of the shaft so as to prevent a portion where the bracket and the first terminal contact each other from being generated during the positional movement of the shaft and supporting the positional movement of the shaft.

However, in the general parking brake switch in the related art, which is configured as described above, the second terminal is coupled to the lower end of the shaft to connect or disconnect the first terminal and the second terminal according to the position of the shaft, and as a result, the switch is exposed to the outside according to the position on the bottom surface of the base, so that when the parking brake in which the switch for parking brake is fixed and installed is delivered, the switch is easily damaged when the parking brake falls or is externally shocked, and as a result, contact failure occurs.

In addition, as described above, since the general parking brake switch in the related art includes the first terminal for the flow of the electricity and the bracket made of a single piece of brass so as to be fixed to the base, a weight of the entire parking brake switch may increase, and as a result, fuel cost is lowered and manufacturing cost increases.

In addition, as described above, since the general parking brake switch in the related art includes the base, the bracket, and the first terminal, a process of isolating the bracket from the base during assembly and a process of isolating the first terminal from the base are required, and as a result, it takes a long time to assemble the parking brake switch.

SUMMARY OF THE INVENTION

Accordingly, the present invention is contrived to address the problems, and an object of the present invention is to provide a lamp switch for a parking brake, in which a connection switch provided to connect or disconnect a ground terminal for a ground terminal and a ground terminal of a connection terminal is configured to be installed inside a support member to respond to a positional change of a shaft by actuating a parking brake lever and the connection switch is not thus exposed to the outside of the support member, and as a result, when the parking brake in which the switch for parking brake is fixed and installed is delivered, the connection switch can be prevented from being damaged during actuation when the parking brake falls or is externally shocked, and as a result, poor contact occurs, thereby preventing contact failure.

Further, the present invention is contrived to address the problems and another object of the present invention is to provide a lamp switch for a parking brake, in which since the connection terminal is fixed to the support member via a fixation holder member molded of a synthetic resin material, a separate fixation piece for fixing the connection terminal to the support member can be excluded to a weight is reduced, and as a result, fuel efficiency can be enhanced and manufacturing cost can be lowered.

In addition, the present invention is contrived to address the problems and yet another object of the present invention is to provide a lamp switch for a parking brake, in which the lamp switch for the parking brake is configured so that at least any one of the ground terminal and the connection terminal form a single body through insert injection with the support member to reduce the number of assembly processes, thereby shortening an assembly time.

Other objects of the present invention will be apparent as the description proceeds.

An exemplary embodiment of the present invention provides a lamp switch for a parking brake, including: a support member in which at least one of ground and connection terminals in which a ground terminal and a connection terminal are formed, respectively is provided with a single body by insert injection so as to implement the lamp switch for a parking brake in a contact state or non-contact state as power is applied or cut-off by being fixed to the parking brake via a fixation member; a movable shaft in which one end is suspended on the support member via a separation preventing member through the support member and the other end is provided to be movable in response to an operation of a parking brake lever; a connection switch formed to make the movable shaft penetrate the center to be positioned inside the support member and provided so that both ends are connected with the ground terminal and the connection terminal; and a restoration spring in which one end is supported onto a bottom surface of the connection switch and the other end is supported on the support member to connect the connection switch with the ground terminal and the connection terminal when a parking brake is actuated and provided to provide restoration force of the movable shaft by making the movable shaft penetrate the center.

According to an exemplary embodiment of the present invention, in a lamp switch for a parking brake, since a connection switch is not exposed to the outside of a support member, when a switch for a parking brake in which the switch for the parking brake is fixed and installed is delivered, the connection switch can be prevented from being damaged during actuation when the parking brake falls or is externally shocked, and as a result, contact failure does not occur, fuel efficiency can be enhanced and manufacturing can be lowered by reducing a weight, and an assembly time can be shortened by reducing the number of assembly processes.

DETAILED DESCRIPTION

Figure 1:
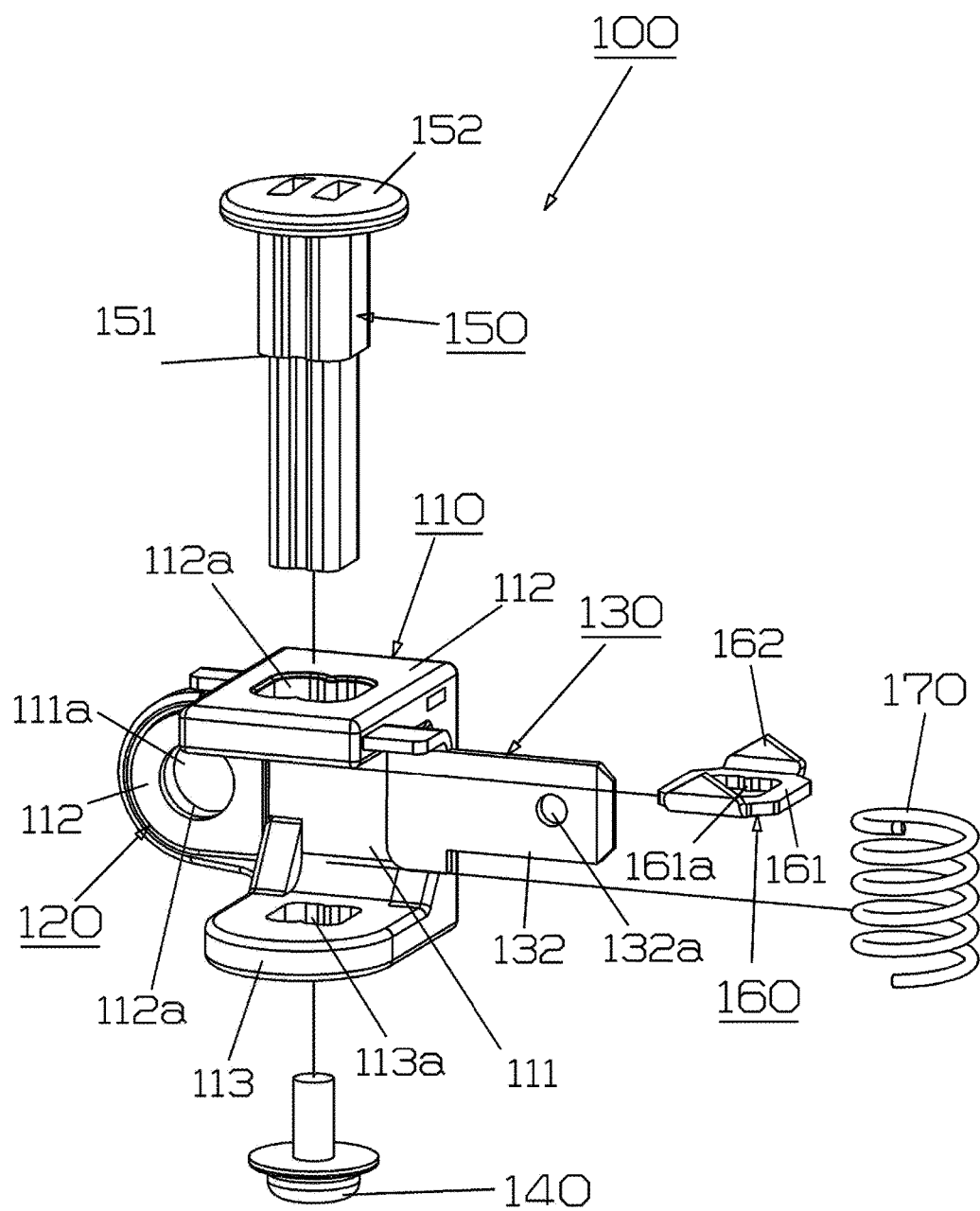
FIG. 1 is an exploded perspective view of a lamp switch for a parking brake according to the present invention.
Figure 2:
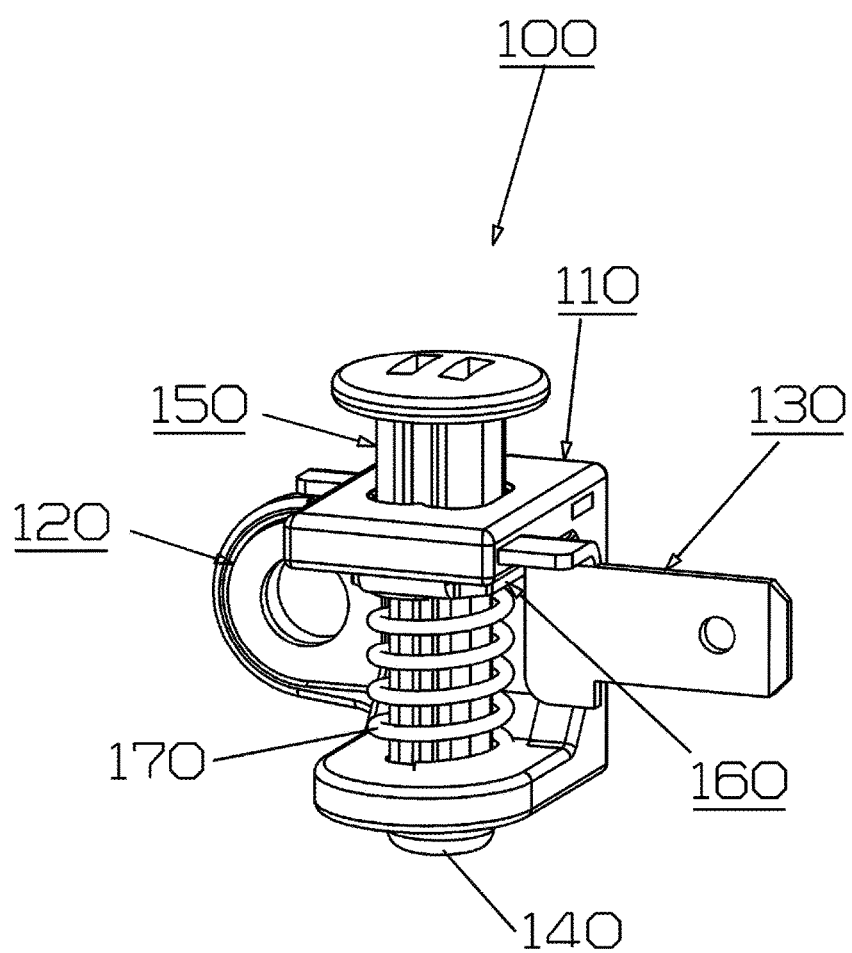
FIG. 2 is a combination perspective view of the lamp switch for a parking brake according to the present invention.
Figure 3A:
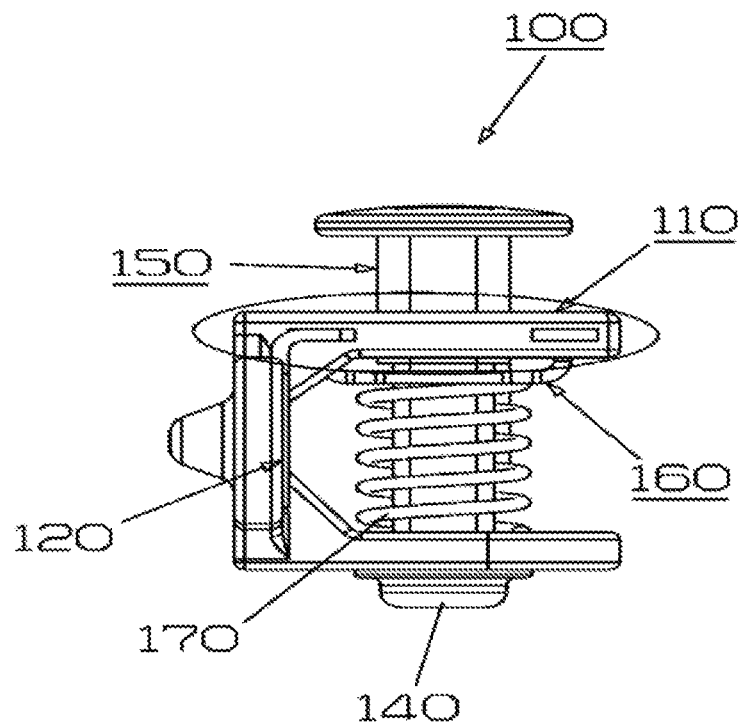
FIG. 3A and FIG. 3B are side views of the lamp switch for a parking brake according to the present invention.
Figure 3B:
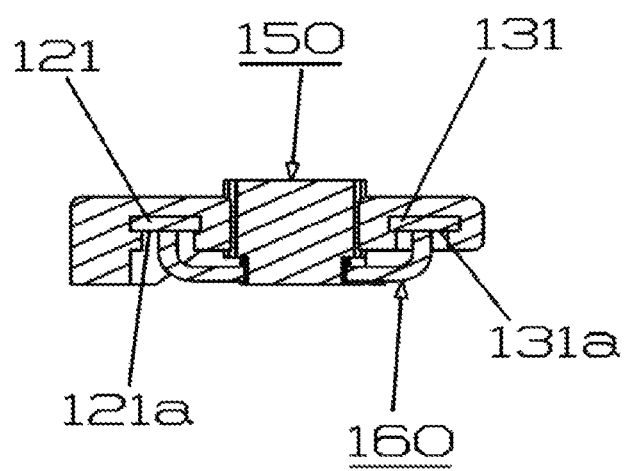

Hereinafter, an exemplary embodiment of a lamp switch for a parking brake according to the present invention will be described in detail.

First, among drawings, it should be noted that same constituent elements or components are represented by the same reference numerals. In describing the present invention, a detailed description of known functions and configurations incorporated will be omitted so as to avoid obscuring the gist of the present invention.

As illustrated, a lamp switch for a parking brake according to the present invention is configured so that a connection switch provided to connect or disconnect a ground terminal for a ground terminal and a ground terminal of a connection terminal is configured to be installed inside a support member and the connection switch is not thus exposed to the outside, and as a result, the connection switch may be prevented from being damaged and as weight may be reduced and at least any one of a ground terminal and a connection terminal is configured by a single body through insert injection with the support member, and as a result, the number of assembly processes may be reduced.

That is, as illustrated in FIGS. 1 to 4, the lamp switch 100 for a parking brake according to the invention described above includes a support member 110 in which at least one of ground and connection terminals 120 and 130 in which a ground terminal 121 and a connection terminal 131 are formed, respectively is provided with a single body by insert injection so as to implement the lamp switch 100 for a parking brake in a contact state or non-contact state as power is applied or cut-off by being fixed to the parking brake via a fixation member; a movable shaft 150 in which one end is suspended on the support member 110 via a separation preventing member 140 through the support member 110 and the other end is provided to be movable in response to an operation of a parking brake lever L; a connection switch 160 formed to make the movable shaft 150 penetrate the center to be positioned inside the support member 110 and provided so that both ends are connected with the ground terminal 121 and the connection terminal 131; and a restoration spring 170 in which one end is supported onto a bottom surface of the connection switch 160 and the other end is supported on the support member 110 to connect the connection switch 160 with the ground terminal 121 and the connection terminal 131 when a parking brake P is actuated and provided to provide restoration force of the movable shaft 150 by making the movable shaft 150 penetrate the center.

Hereinafter, the lamp switch for a parking brake according to the present invention will be described below in more detail with reference to the accompanying drawings.

First, the support member of the lamp switch for a parking brake according to the present invention is formed to fix the ground and connection terminals 120 and 130, and provided to prevent the connection switch 160 installed on the movable shaft 150 from being exposed to the outside by guiding the movable shaft 150.

That is, as illustrated in FIGS. 1 to 4, the support member 110 includes a fixation plate 111 having a fixation hole 111a formed at one side thereof to be fixed to A parking brake P via a fixation member constituted by a bolt and a nut and upper and lower guide plates 112 and 113 which are bent and extended from an upper end and a lower end of the fixation plate 111 in one direction, in which the ground terminal 121 of the ground terminal 120 and the connection terminal 131 of the connection terminal 130 are formed at one side and the other side in a plate shape and upper and lower guide through-holes 112a and 113a having a polygonal shape are formed on the plate, respectively so as to penetrate one end of the movable shaft 150.

As illustrated in FIGS. 1 to 4, the ground terminal 120 is provided in such a manner that one side of one bottom surface of the upper guide plate 112 formed on an upper end of the fixation plate 111 of the support member 110 and one end and the other end are fixed to the fixation plate 111 with the fixation hole 111a are fixed by insert injection and the other bottom surface is provided to be partially exposed so as to be connected with the connection switch 160 to implement the lamp switch 100 for a parking brake in a contact state or non-contact state by a current position of the movable shaft 150.

That is, the ground terminal 120 includes the ground terminal 121 provided in such a manner that a ground exposure plane 121a to and from which the connection switch 160 is connected and disconnected is formed on one bottom surface of the upper guide plate 112 formed on the upper end of the fixation plate 111 of the support member 110 by partially exposing a part of the bottom surface by the insert injection and a ground fixation plate 122 which is bent and extended from the ground terminal 121 in one direction to be integrally provided on the fixation plate 111 with the fixation hole 111a by the insert injection and a ground fixation hole 122a which matches the fixation hole 111a is formed on the ground fixation plate 122.

As illustrated in FIGS. 1 to 4, the connection terminal 130 is provided in such a manner that a part of the bottom is exposed so as to connect the connection switch 160 by fixing one end of the connection terminal 130 to the other side of the bottom surface of the upper guide plate 112 formed on the upper end of the fixation plate 111 of the support member 110 by the insert injection and the other end is exposed to the outside so as to be connected with a connection connector provided for flow of electricity.

That is, the connection terminal 130 includes the connection terminal 131 provided in such a manner that a connection exposure plane 131a to and from which the connection switch 160 is connected and disconnected is formed on the other side of the bottoms surface of the upper guide plate 112 of the support member 110 in which the ground terminal 121 of the ground terminal 120 is inset-injected by exposing a part of the bottom surface by the insert injection and a connection plate 132 in which a connection hole 132a is drilled so as to be exposed to the outside and connected with the connection connector provided for the flow of the electricity by being bent and extended from the connection terminal 131 in one direction.

Figure 4:
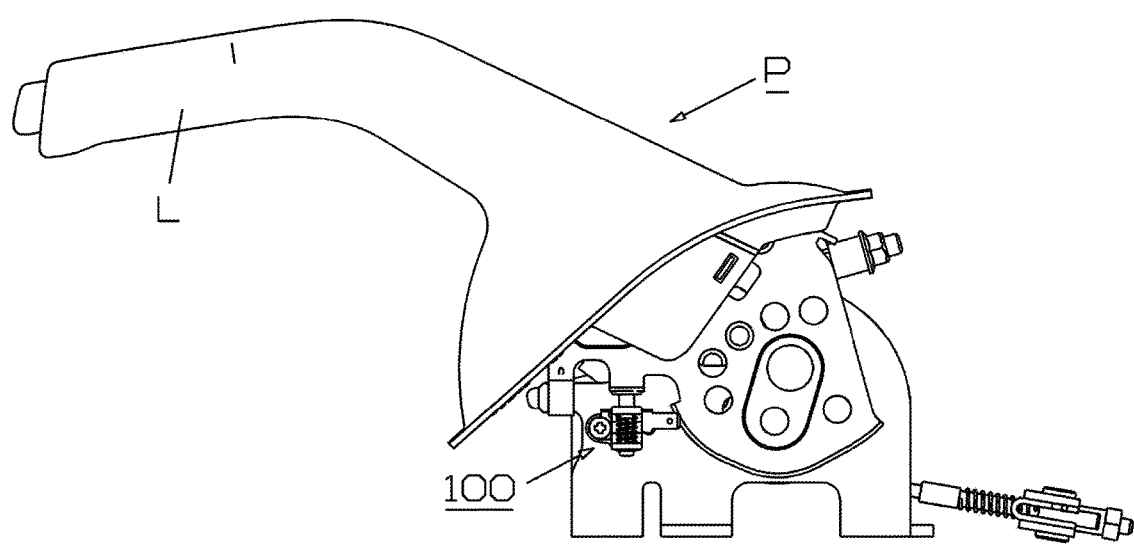
FIG. 4 is a diagram illustrating a state in which the lamp switch for a parking brake is installed in the parking brake according to the present invention.
Figure 5:
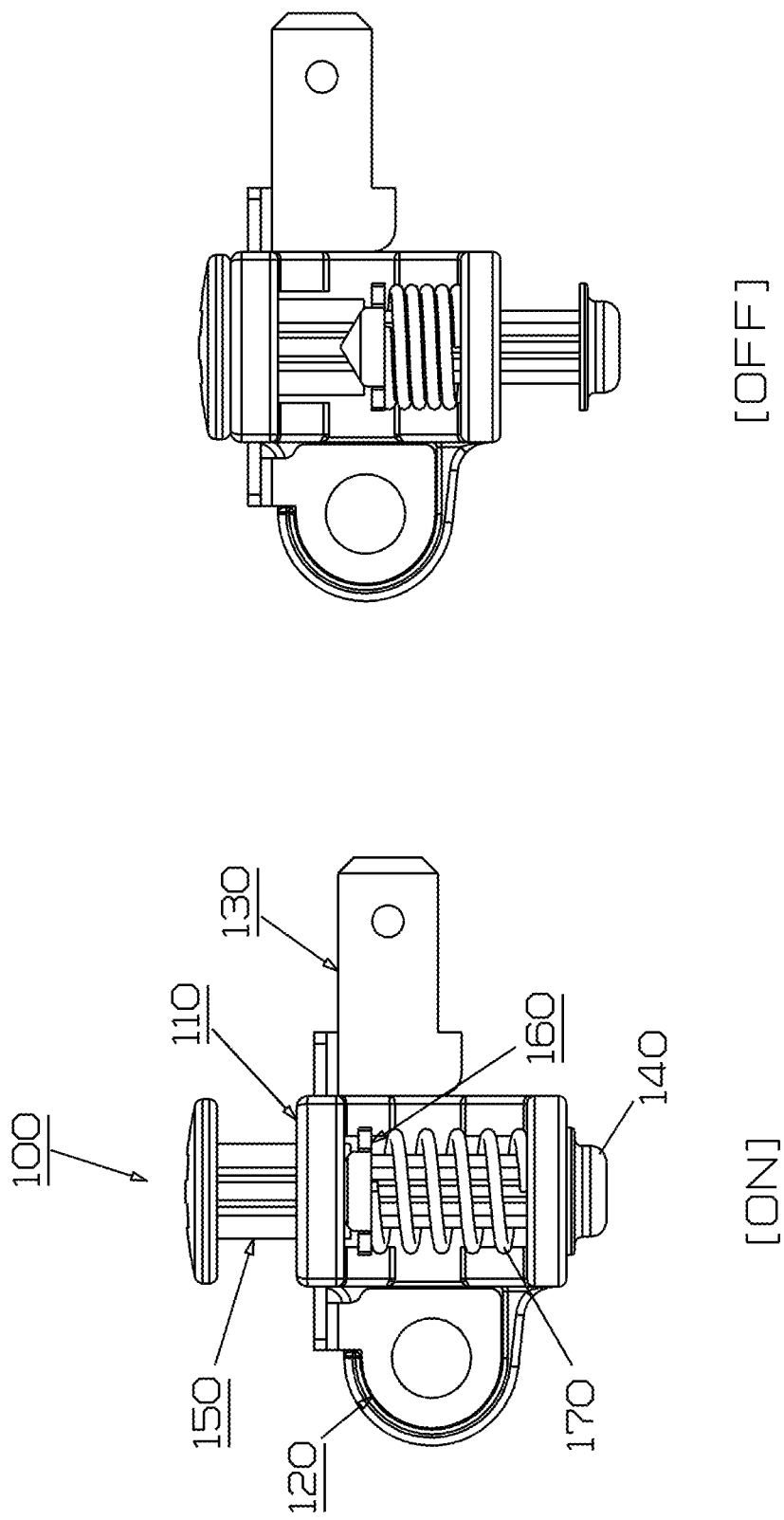
FIG. 5 is a diagram illustrating an operation state of a lamp switch for a parking brake according to the present invention.

As illustrated in FIGS. 1 and 4, the movable shaft 150 is provided in such a manner that one end is suspended via the separation preventing member 140 by penetrating each of the upper and lower guide through-holes 112a and 113a formed on the upper and lower guide plates 112 and 113 of the support member 110 and the other end contacts or does not contact in response to the operation of the parking brake lever L.

That is, the movable shaft 150 is provided in such a manner that one end has a polygonal cross-section so as not to rotate by penetrating the polygonal upper and lower guide through-holes 112a and 113a formed on the upper and lower guide plates 112 and 113, a step portion 151 is formed in a middle part so as to suspend the connection switch 160, a screw groove (not illustrated) is formed on one bottom surface so as to fix the separation preventing member 140 by a screw coupling scheme, and a suspension piece 152 for preventing the separation is formed on the other end.

The connection switch 160 is located inside the support member 110 by making the movable shaft 150 penetrate the center and provided in such a manner that one end is supported on the restoration spring 170 and the other end is connected to and disconnected from the ground exposure plane 121a and the connection exposure plane 131a of the ground terminal 121 and the connection terminal 131 of which the bottoms surfaces are partially exposed while being fixed to the upper guide plate 112 of the support member 110 by the insert injection in response to the operation of the parking brake.

That is, the connection switch 160 includes a connection movable plate 161 in which a polygonal connection movable hole 161a is drilled at the center so as to penetrate one end of the movable shaft 150 and be suspended to the step portion 151 and a connection piece 172 formed by a triangular cross-section so as to be connected to and disconnected from the ground exposure plane 121a of the ground terminal 121 and the connection exposure plane 131a of the connection terminal 131 which are bent and extended from both ends of the connection movable plates 161 upward, respectively and in which the bottom surface is partially exposed in response to the operation of the parking brake.

Meanwhile, the ground and connection terminals 120 and 130 of the lamp switch 100 for a parking brake according to the present invention are formed in the support member 110 as the single body by the insert injection, but the present invention is not limited thereto and the connection terminal 130 may be configured to be separated and fixed in a sliding method so as to be connected with a connection direction of the connector to be connected in response to a type another vehicle.

When a driver pulls the parking brake lever L for parking while the parking lamp switch 100 for a parking brake according to the present invention is fixed to the parking brake via a fixation member such as a bolt and a nut, the ground terminal 121 and the connection terminal 131 are connected to each other while the connection switch 160 moves up by the restoration spring 170 as illustrated in FIGS. 1 to 5.

More specifically, a state before pulling the parking brake lever L as a state in which a contact plane of the parking brake presses the other end of the movable shaft 150 to compress the restoration spring 170 installed on the movable shaft 150 and move down the connection switch 160 downward and in this case, the ground terminal 121 and the connection terminal 131 are not connected to each other.

In this case, when the driver pulls the parking brake lever L, the movable shaft 150 pressed by the contact plane of the parking brake is released, and as a result, the movable shaft 150 moves upward by the restoration spring 170.

Simultaneously, both ends of the connection switch 160 are connected to the ground exposure plane 121a and the connection exposure plane 131a of the ground terminal 121 and the connection terminal 131 which are partially exposed at one side and the other side of the bottom surface of the upper guide plate 112, respectively.

As a result, a lamp provided on an instrumental panel of the vehicle is lighted to announce to the driver that the parking brake is actuated.

The connection switch 160 of the lamp switch for the parking brake according to the present invention is positioned inside the support member 110 and connect and disconnect the ground terminal 121 and the connection terminal 111 in response to pulling and releasing the parking brake lever L to prevent the connection switch 160 from being easily damaged by external force.

The above description just illustrates the technical spirit of the present invention and various changes and modifications can be made by those skilled in the art to which the present invention pertains without departing from an essential characteristic of the present invention. Therefore, the exemplary embodiments of the present invention are provided for illustrative purposes only but not intended to limit the technical concept of the present invention. The scope of the technical concept of the present invention is not limited thereto. The protective scope of the present invention should be construed based on the following claims, and all the technical concepts in the equivalent scope thereof should be construed as falling within the scope of the present invention.

What is claimed is:

1. A lamp switch for a brake, comprising:
    a support member 110 in which at least one of a ground terminal 120 and a connection terminal 130 is provided with a single body by insert injection so as to implement the lamp switch for a parking brake in a contact state or non-contact state as power is applied or cut-off by being fixed to the parking brake via a fixation member, the ground terminal 120 including a ground part 121, and the connection terminal 130 including a connection part 131;
    a movable shaft 150 having a first end and a second end in which the first end is suspended on the support member 110 via a separation preventing member 140 through the support member 110 and the second end is provided to be movable in response to an operation of a parking brake lever L;
    a connection switch 160 formed to make the movable shaft 150 penetrate a center of the connection switch 160 to be positioned inside the support member 110 and provided so that both ends of the connection switch 160 are connected with the ground part 121 and the connection part 131; and
    a restoration spring 170 having a first end and a second end in which the first end of the restoration spring 170 is supported onto a bottom surface of the connection switch 160 and the second end of the restoration spring 170 is supported on the support member 110 to connect the connection switch 160 with the ground part 121 and the connection part 131 when the parking brake is actuated and provided to provide restoration force of the movable shaft 150 by making the movable shaft 150 penetrate a center of the restoration spring 170,
    wherein the support member 110 includes a fixation plate 111 having a fixation hole 111a, an upper guide plate 112 and a lower guide plate 113,
    wherein the upper guide plate 112 includes an upper surface and a bottom surface, and
    wherein the ground terminal 120 includes the ground part 121 provided in such a manner that a ground exposure plane 121a to and from which the connection switch 160 is connected and disconnected is formed on the bottom surface of the upper guide plate 112 formed on an upper end of the fixation plate 111 of the support member 110 by partially exposing a part of the bottom surface of the upper guide plate 112 by the insert injection and a ground fixation plate which is bent and extended from the ground part 121 in one direction to be integrally provided on the fixation plate 111 by the insert injection and a ground fixation hole which matches the fixation hole 111a is formed on the ground fixation plate.

2. The lamp switch of claim 1, wherein the fixation plate 111 having the fixation hole 111a is formed to be fixed to the parking brake via the fixation member, and the upper guide plate 112 and the lower guide plate 113 are bent and extended from the upper end and a lower end of the fixation plate 111 in one direction,
    wherein the bottom surface of the upper guide plate 112 includes a first side and a second side,
    wherein the ground part 121 of the ground terminal 120 and the connection part 131 of the connection terminal 130 are formed at the first side and the second side, and an upper guide through-hole 112a and a lower guide through-hole 113a each having a polygonal shape are formed on the upper guide plate 112 and the lower guide plate 133, respectively so that one end of the movable shaft 150 penetrates the upper guide through-hole 112a and the lower guide through-hole 113a.

3. The lamp switch of claim 1, wherein the connection switch 160 includes a connection movable plate 161 in which a polygonal connection movable hole 161a is drilled at a center of the connection movable plate 161 so as to penetrate one end of the movable shaft 150 and be suspended to a step portion 151 and connection pieces formed by a triangular cross-section so as to be connected to and disconnected from the ground exposure plane 121a of the ground part 121 and a connection exposure plane 131a of the connection part 131, wherein the connection pieces are bent and extended from both ends of the connection movable plates 161 upward, respectively.

4. A lamp switch for a brake, comprising:
    a support member 110 in which at least one of a ground terminal 120 and a connection terminal 130 is provided with a single body by insert injection so as to implement the lamp switch for a parking brake in a contact state or non-contact state as power is applied or cut-off by being fixed to the parking brake via a fixation member, the ground terminal 120 including a ground part 121, and the connection terminal 130 including a connection part 131;
    a movable shaft 150 having a first end and a second end in which the first end is suspended on the support member 110 via a separation preventing member 140 through the support member 110 and the second end is provided to be movable in response to an operation of a parking brake lever L;
    a connection switch 160 formed to make the movable shaft 150 penetrate a center of the connection switch 160 to be positioned inside the support member 110 and provided so that both ends of the connection switch 160 are connected with the ground part 121 and the connection part 131; and
    a restoration spring 170 having a first end and a second end in which the first end of the restoration spring 170 is supported onto a bottom surface of the connection switch 160 and the second end of the restoration spring 170 is supported on the support member 110 to connect the connection switch 160 with the ground part 121 and the connection part 131 when the parking brake is actuated and provided to provide restoration force of the movable shaft 150 by making the movable shaft 150 penetrate a center of the restoration spring 170,
    wherein the support member 110 includes an upper guide plate 112 and a lower guide plate 113,
    wherein the upper guide plate 112 includes an upper surface and a bottom surface,
    wherein the bottom surface of the upper guide plate 112 includes a first side and a second side, and
    wherein the connection terminal 130 includes the connection part 131 provided in such a manner that a connection exposure plane 131a to and from which the connection switch 160 is connected and disconnected is formed on the second side of the bottom surface of the upper guide plate 112 of the support member 110 in which the ground part 121 of the ground terminal 120 is insert-injected by exposing a part of the bottom surface of the upper guide plate 112 by the insert injection and a connection plate 132 in which a connection hole 132*a* is drilled so as to be exposed to an outside and connected with a connection connector provided for flow of an electricity by being bent and extended from the connection part 131 in one direction.

* * * * *